US012165562B2

(12) United States Patent
Jiang et al.

(10) Patent No.: US 12,165,562 B2
(45) Date of Patent: Dec. 10, 2024

(54) DEMULTIPLEXER AND DRIVING METHOD THEREOF, AND DISPLAY PANEL HAVING DEMULTIPLEXER

(71) Applicant: GUANGZHOU CHINA STAR OPTOELECTRONICS SEMICONDUCTOR DISPLAY TECHNOLOGY CO., LTD., Guangdong (CN)

(72) Inventors: Zhixiong Jiang, Guangdong (CN); Yanhong Meng, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/759,372

(22) PCT Filed: Jul. 12, 2022

(86) PCT No.: PCT/CN2022/105034

§ 371 (c)(1),
(2) Date: Jul. 24, 2022

(87) PCT Pub. No.: WO2023/245754

PCT Pub. Date: Dec. 28, 2023

(65) Prior Publication Data

US 2024/0194111 A1 Jun. 13, 2024

(30) Foreign Application Priority Data

Jun. 23, 2022 (CN) ......................... 202210717722.3

(51) Int. Cl.
*G09G 3/20* (2006.01)

(52) U.S. Cl.
CPC .................... *G09G 3/2092* (2013.01); *G09G 2300/0426* (2013.01); *G09G 2310/0297* (2013.01); *G09G 2310/08* (2013.01); *G09G 2320/0233* (2013.01)

(58) Field of Classification Search
None
See application file for complete search history.

(56) References Cited

U.S. PATENT DOCUMENTS 7,742,021 B2 * 6/2010 Shin .................... G09G 3/3275
345/82
9,741,306 B2 * 8/2017 Kim .................... G09G 3/3648
(Continued)

FOREIGN PATENT DOCUMENTS

CN 103744209 A 4/2014
CN 109448631 A 3/2019
(Continued)

OTHER PUBLICATIONS

International Search Report in International application No. PCT/CN2022/105034, mailed on Dec. 21, 2022.
(Continued)

*Primary Examiner* — Fred Tzeng
(74) *Attorney, Agent, or Firm* — PV IP PC; Wei Te Chung

(57) ABSTRACT

Disclosed in the present application is a demultiplexer and a driving method thereof, and a display panel having the demultiplexer. Each output channel is respectively connected to (K−1) data lines through (K−1) switching transistors and directly connected to another data line; each metal electrode plate is disposed nearby to the another data line respectively, so that a feedthrough effect on the another data line is close to that on other (K−1) data lines, thereby achieving better display uniformity on the display panel.

16 Claims, 11 Drawing Sheets

(56) References Cited

U.S. PATENT DOCUMENTS

| | | | | |
|---|---|---|---|---|
| 9,754,537 | B2 * | 9/2017 | Lee | G09G 3/3208 |
| 11,195,484 | B2 * | 12/2021 | Li | G09G 3/3648 |
| 2010/0117939 | A1 * | 5/2010 | Lee | G09G 3/3275<br>345/76 |
| 2011/0169018 | A1 | 7/2011 | Hsiao et al. | |
| 2016/0171924 | A1 | 6/2016 | Kim et al. | |
| 2017/0309230 | A1 * | 10/2017 | Kwon | G09G 3/3275 |
| 2020/0020296 | A1 * | 1/2020 | Kim | G09G 3/3648 |
| 2020/0111420 | A1 * | 4/2020 | Yang | G09G 3/3291 |
| 2024/0071331 | A1 * | 2/2024 | Tao | G09G 3/3688 |

FOREIGN PATENT DOCUMENTS

| | | | |
|---|---|---|---|
| CN | 109634010 | A | 4/2019 |
| KR | 20080000361 | A | 1/2008 |
| KR | 20200129609 | A | 11/2020 |

OTHER PUBLICATIONS

Written Opinion of the International Search Authority in International application No. PCT/CN2022/105034, mailed on Dec. 21, 2022.

* cited by examiner

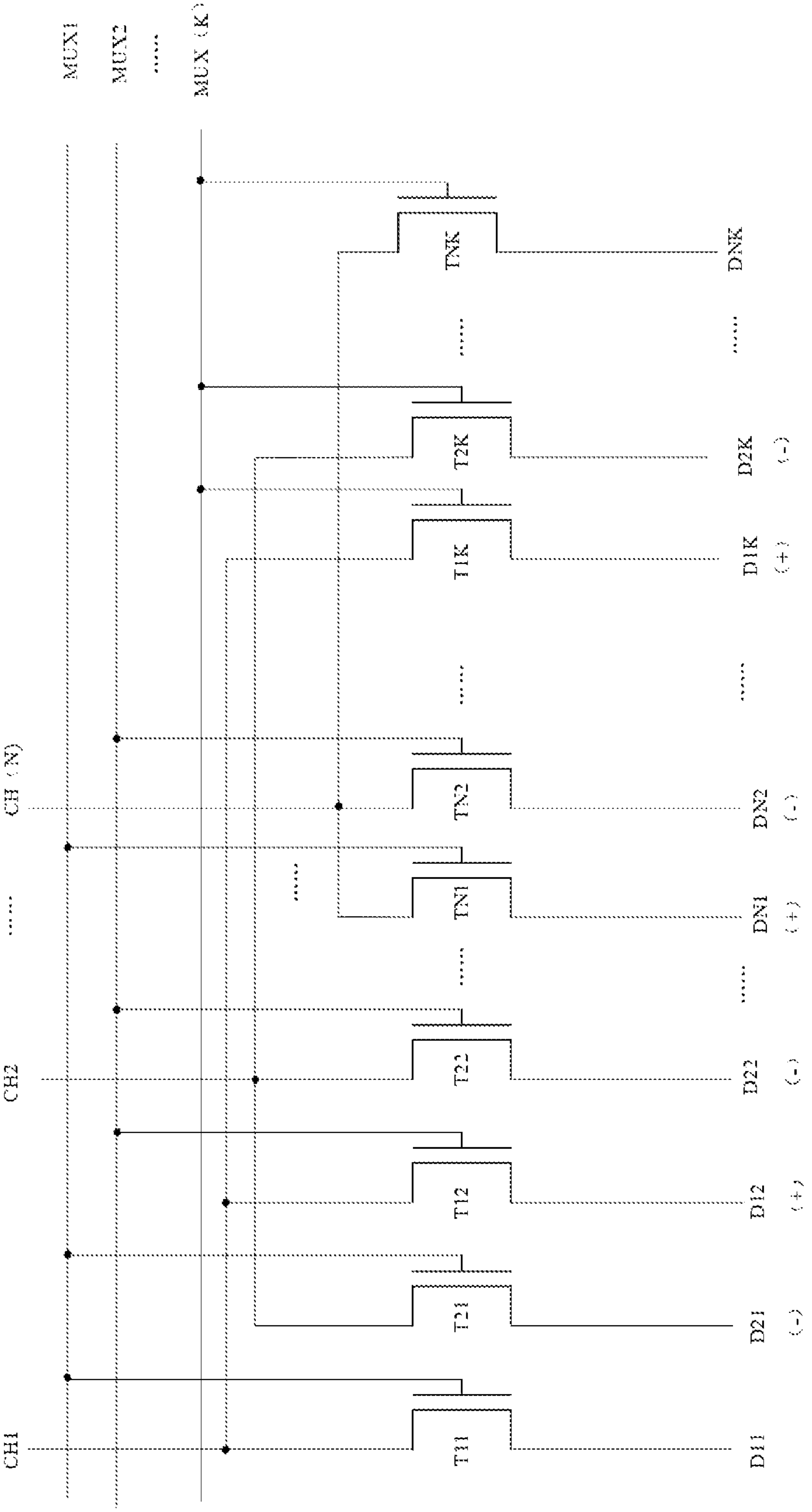
FIG.1A-PRIOR ART

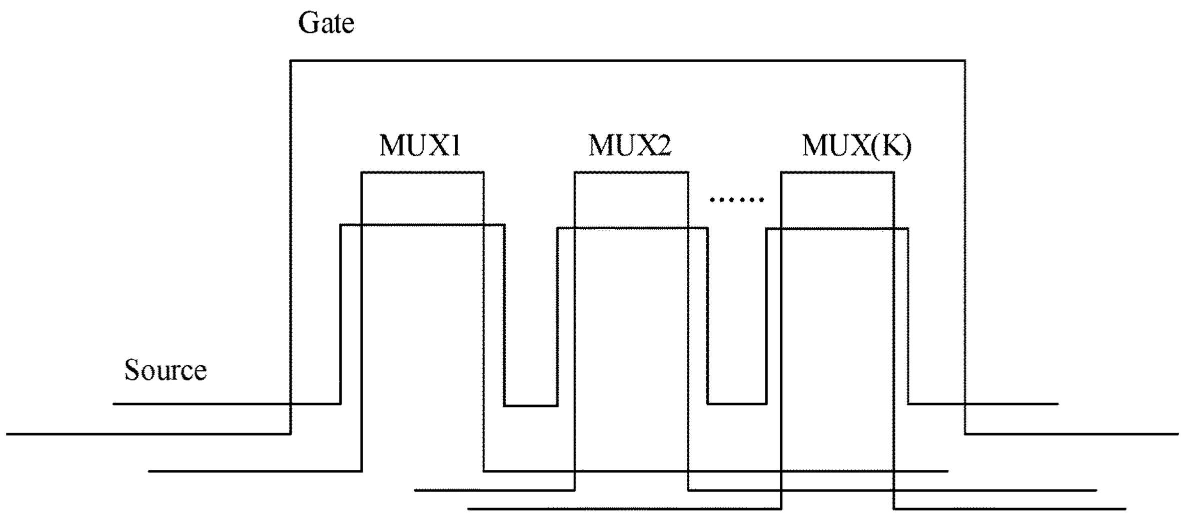
FIG. 1B - PRIOR ART
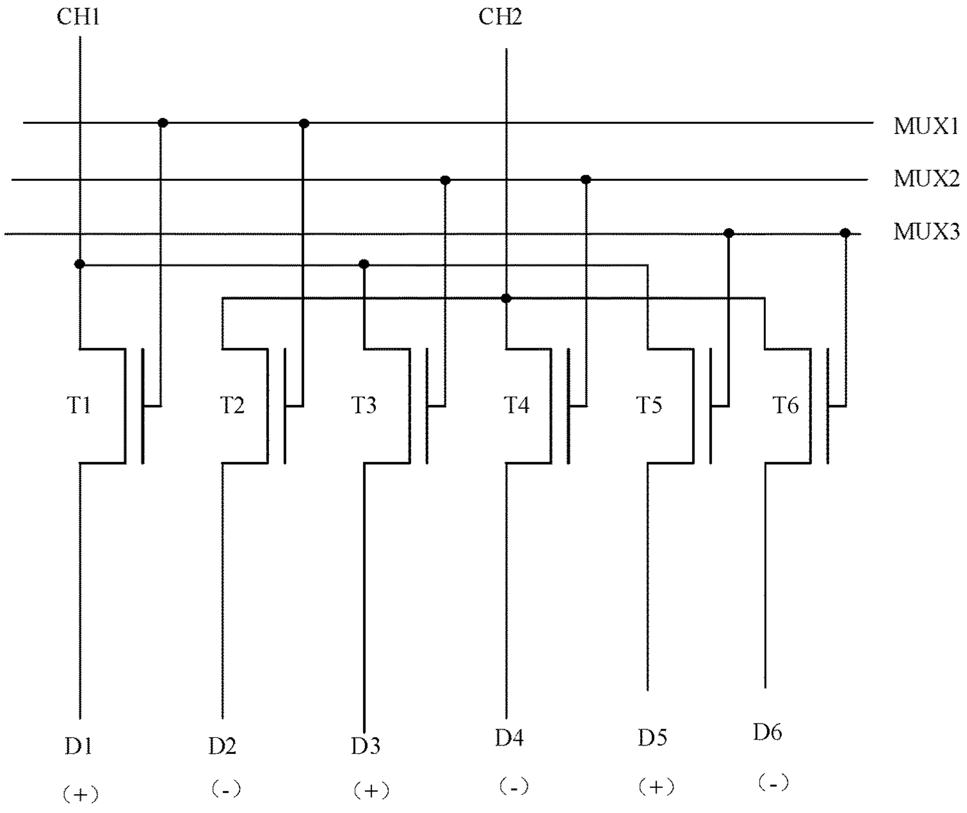
FIG. 2A - PRIOR ART

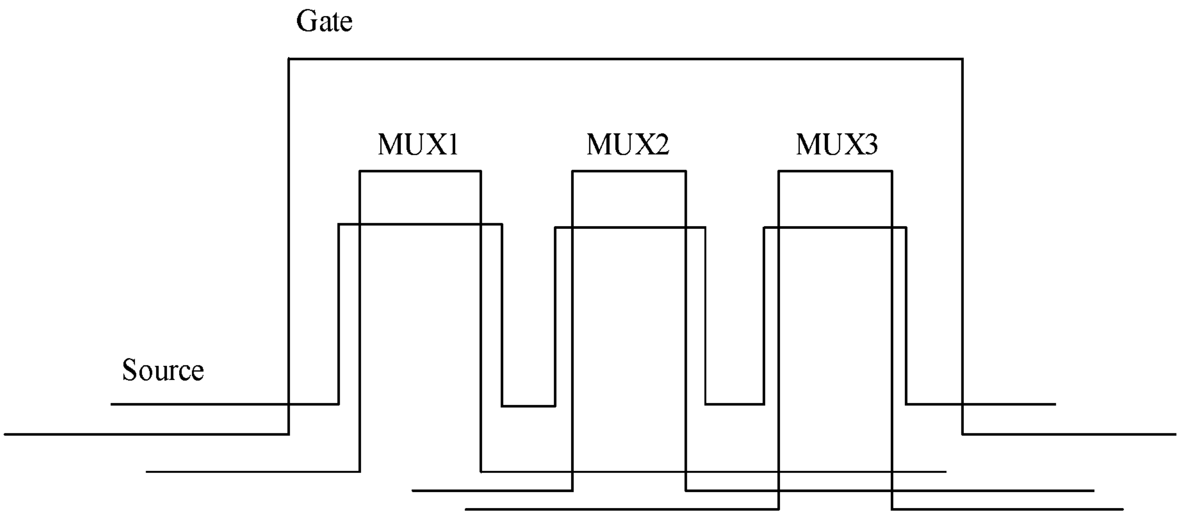
FIG. 2B - PRIOR ART

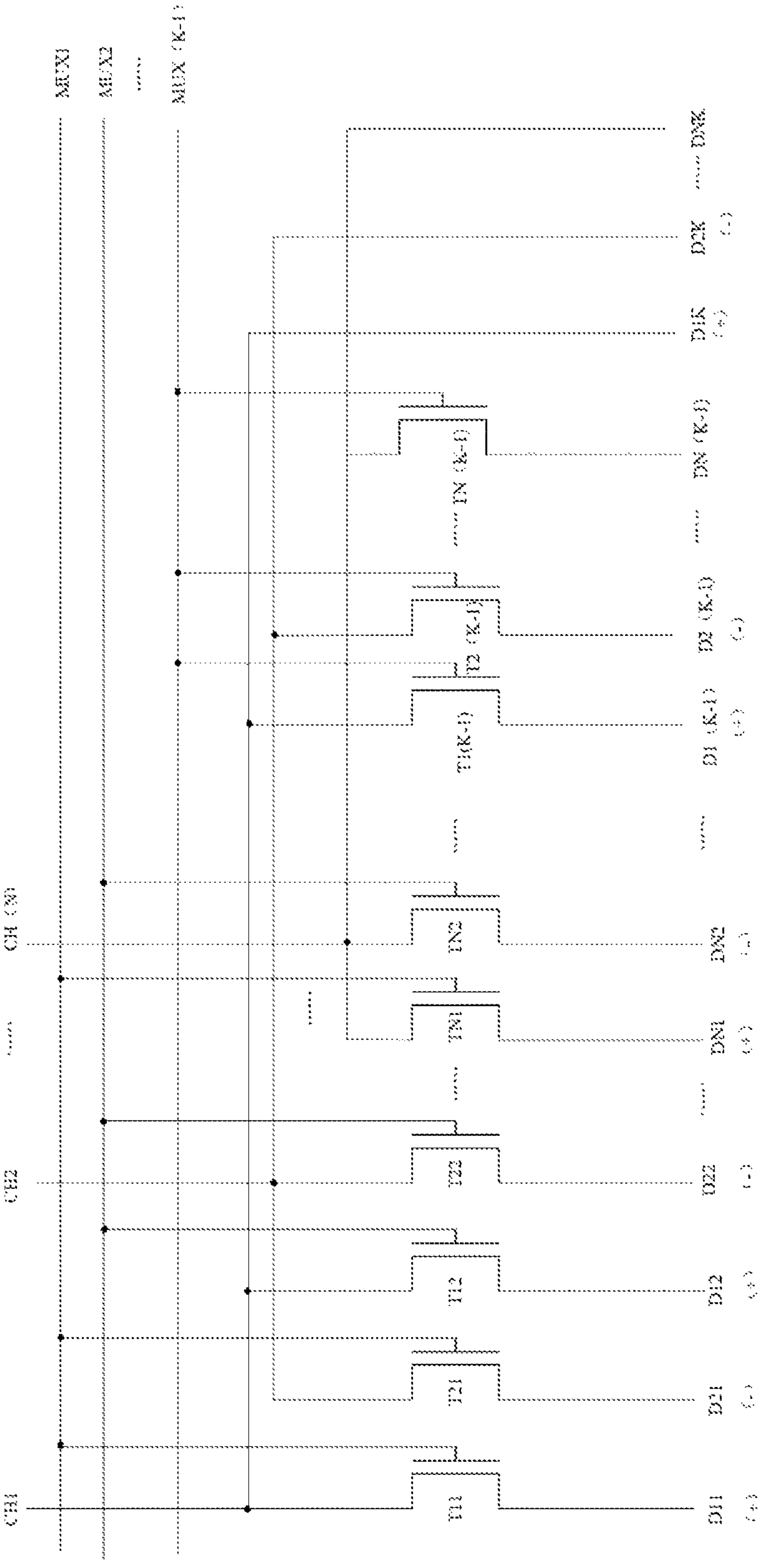
FIG.3A-PRIOR ART

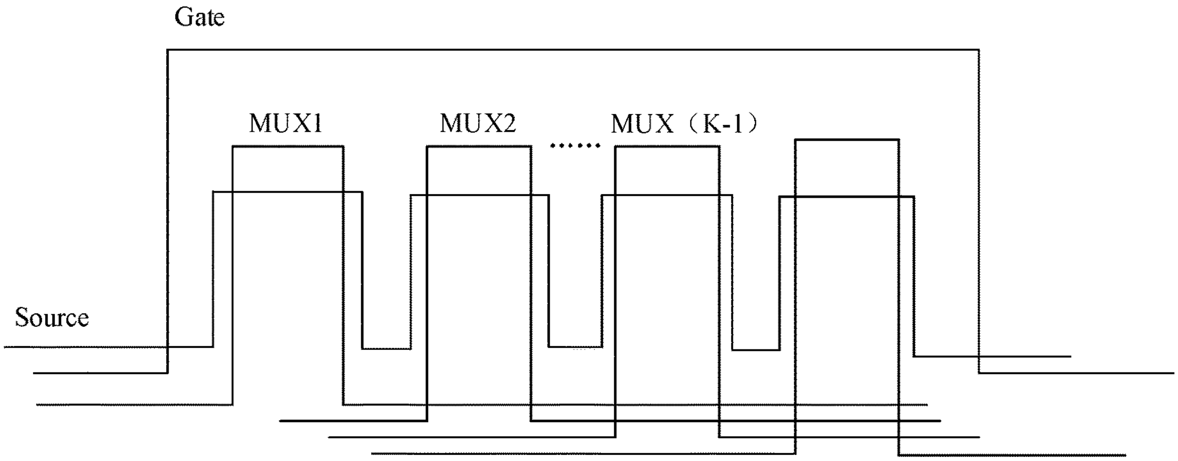
FIG. 3B - PRIOR ART
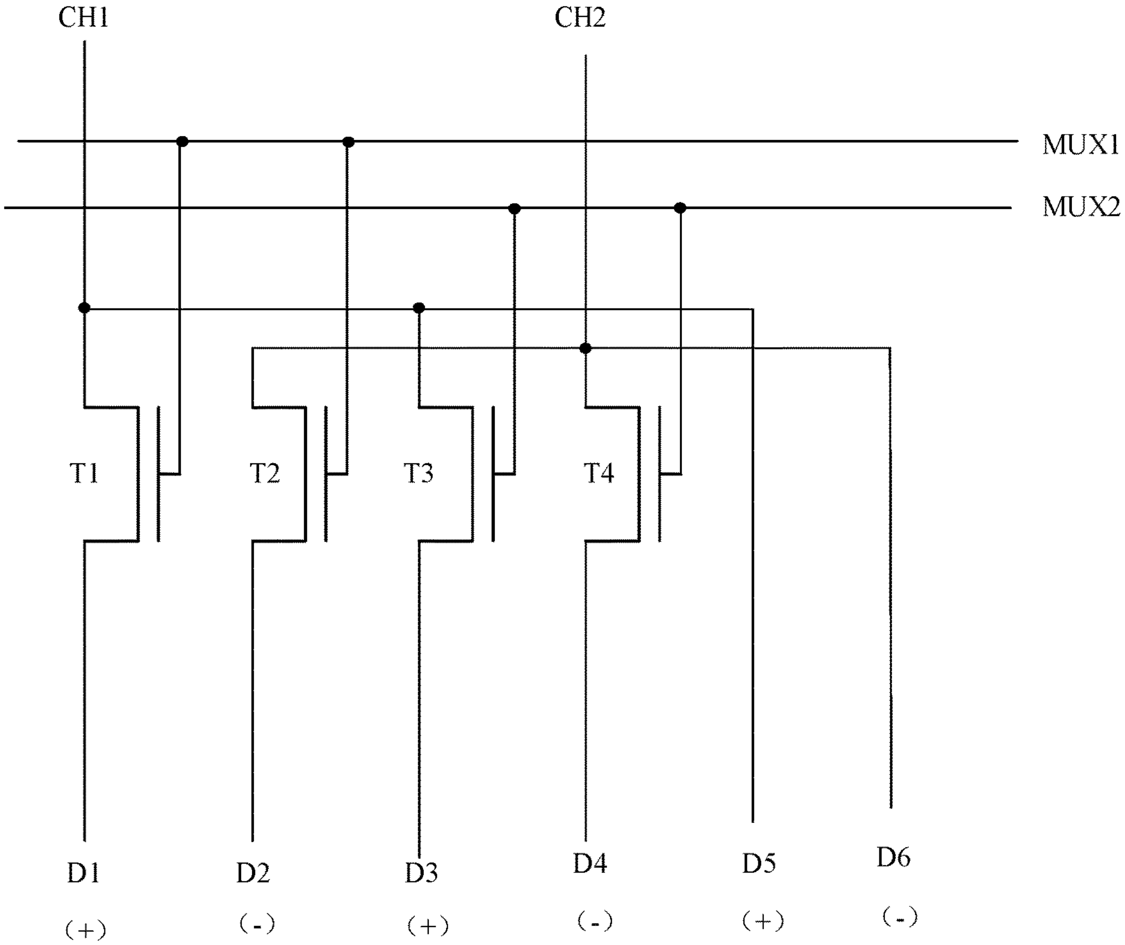
FIG. 4A - PRIOR ART

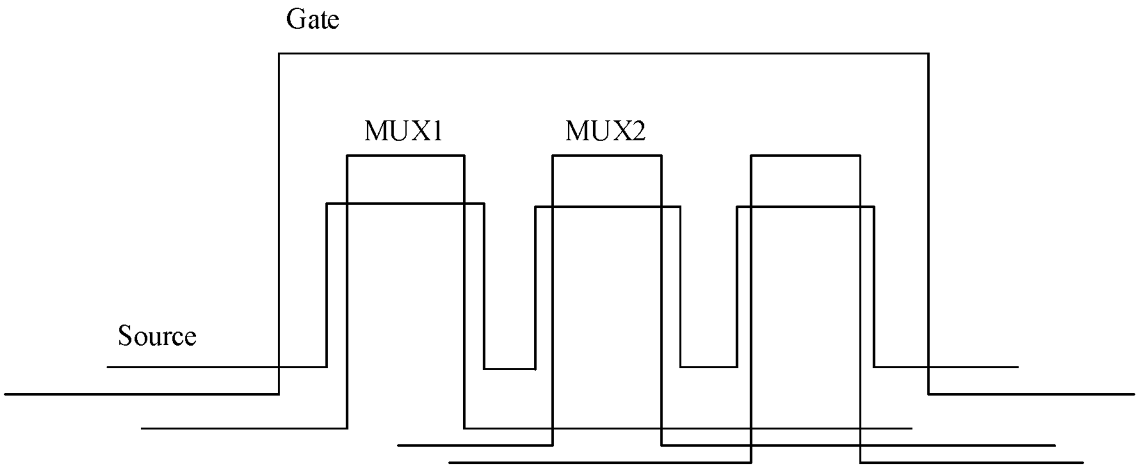
FIG. 4B - PRIOR ART

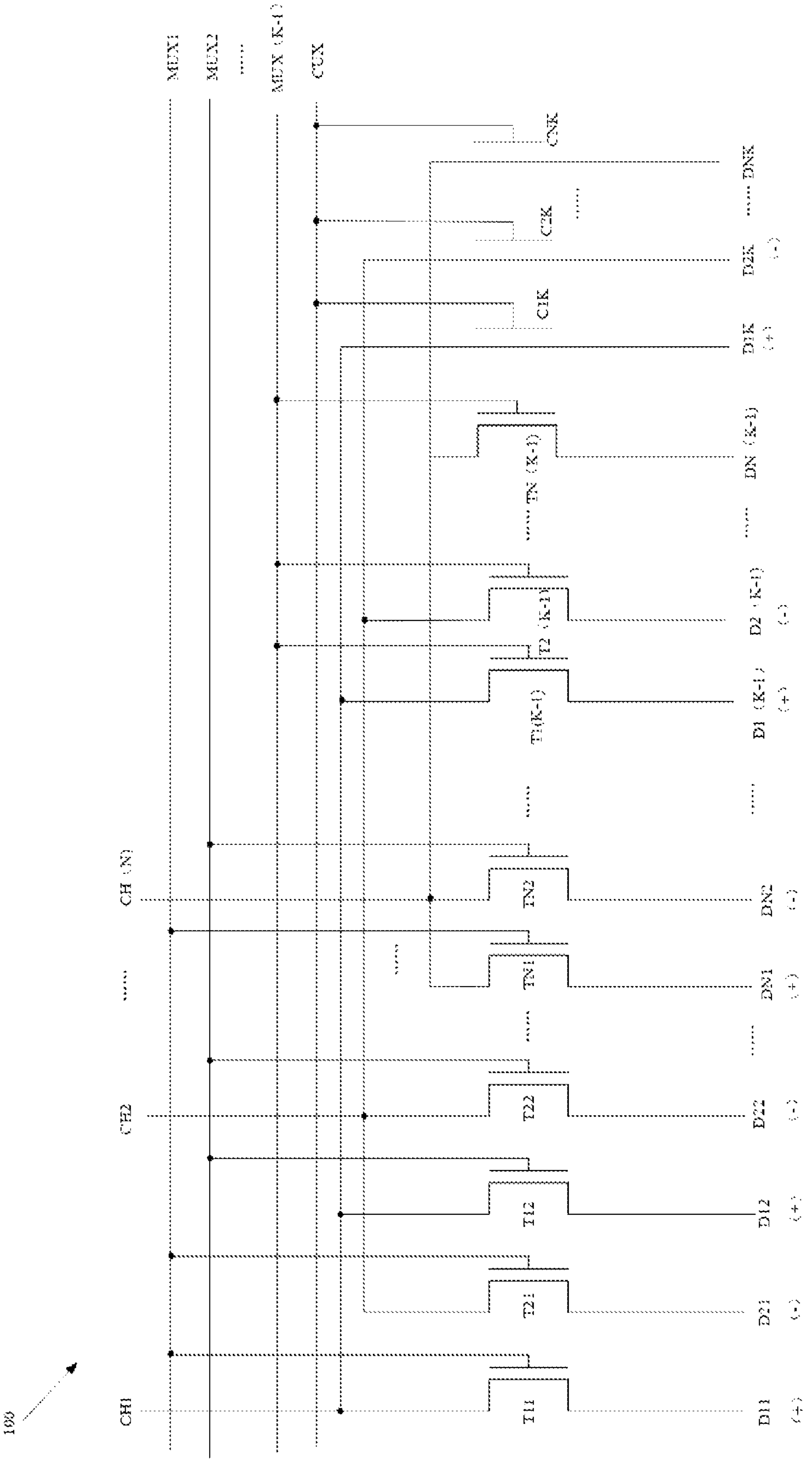
FIG.5A-PRIOR ART

DEMULTIPLEXER AND DRIVING METHOD THEREOF, AND DISPLAY PANEL HAVING DEMULTIPLEXER

CROSS-REFERENCE TO RELATED APPLICATIONS

This application is a US National Phase application based upon International Application No. PCT/CN2022/105034, filed on Jul. 12, 2022, which claims priority benefit to Chinese Patent Application No. 202210717722.3 filed on Jun. 23, 2022, titled "DEMULTIPLEXER AND DRIVING METHOD THEREOF, AND DISPLAY PANEL HAVING DEMULTIPLEXER", the entire contents of which are hereby incorporated by reference in its entirety in this application.

FIELD OF DISCLOSURE

The present application relates to a field of display technology, and more specifically, to a demultiplexer and a driving method thereof, and a display panel having the demultiplexer.

BACKGROUND

With a continuous increase in size and resolution of a display panel, when each output channel of source driver integrated circuits (IC) is connected to each data line of the display panel one-to-one, there is a problem of increased costs due to an increased number of source driver ICs. Therefore, in order to reduce a number of source driver ICs, a demultiplexer (DEMUX) is disposed between the source driver ICs and data lines in a non-display region of the display panel and configured to input data signals to a plurality of data lines by time-division of one output channel of the source driver ICs, thereby reducing a number of data driver ICs and reducing costs.

As shown in FIG. 1A and FIG. 1B together, taking a traditional 1:K DEMUX circuit as an example, each output channel CH (also known as an output source Source) of the source driver ICs is distributed to K data lines, a thin-film transistor (TFT), disposed between each output channel CH and each data line, acts as a switch, and an on-off of the TFT is controlled by a MUX control signal. For N output channels, K MUX control signals and KN TFTs need to be arranged, requiring a certain area to be occupied, making it difficult to achieve narrow bezels and consume more power. FIG. 2A and FIG. 2B are a structure diagram and a time diagram of a traditional DEMUX circuit, respectively, taking two output channels as an example, each output channel is distributed to three data lines.

In view of this, as shown in FIG. 3A, there are currently related patents that improve the traditional 1:K DEMUX circuit by directly connecting each output channel to a corresponding last data line, that is, a $K^{th}$ data line, omitting a TFT and a $K^{th}$ MUX control signal between each output channel and a corresponding $K^{th}$ data line, and finally using only (K−1)N TFTs and (K−1) MUX control signals. This reduces a size of the demultiplexer and power consumption of the demultiplexer, making the display panel more conducive to narrow bezels and power saving.

Specifically, in conjunction with FIG. 3A and FIG. 3B, if each output channel inputs data signals to the first data line to the $K^{th}$ data line in sequence, when a first MUX control signal is at a high level, a first TFT of each output channel is turned on, and each output channel inputs a data signal to a corresponding first data line; when a second MUX control signal is at the high level, a second TFT of each output channel is turned on, and each output channel inputs a data signal to a corresponding second data line, and so on; when a (K−1)th MUX control signal is at the high level, a (K−1)th TFT of each output channel is turned on, and each output channel inputs a data signal to a corresponding (K−1)th data line, and when (K−1) MUX control signals are all at a low level, TFTs between each output channel and corresponding (K−1) data lines are turned off, so that each output channel inputs a finally displayed image to the corresponding $K^{th}$ data line, so as to complete a display of one frame of image. It should be noted that although each output channel also input the data signal to the $K^{th}$ data line directly connected thereto when the (K−1) MUX control signals are at the high level in sequence, the finally displayed image will be displayed by the $K^{th}$ data line according to the data signal input from each output channel when the (K−1) MUX control signals are all at the low level. Therefore, when the (K−1) MUX control signals are at the high level in sequence, the data signal input from each output channel to the $K^{th}$ data line does not affect display result of each frame.

Technical Problem

The 1:K DEMUX circuit shown in FIG. 3A however has following problems: as the MUX control signal is converted from the low level to the high level, or from the high level to the low level, there is a gate-source parasitic capacitance Cgs and a gate-drain parasitic capacitance Cgd in the TFT, and under an influence of parasitic capacitance, voltage of the data line will rise or fall to a certain extent, which is a feedthrough effect. However, since each output channel is directly connected to the corresponding $K^{th}$ data line, there is no feedthrough effect on the $K^{th}$ data line, which makes brightness of a pixel unit controlled by the $K^{th}$ data line differ from that of a plurality of pixel units controlled by other (K−1) data lines. In particular, the brightness of the pixel unit controlled by the $K^{th}$ data line is slightly brighter than that of the plurality of pixel units controlled by the other (K−1) data lines, resulting in an uneven display of the display panel. FIG. 4A and FIG. 4B are a structure diagram and a timing diagram of an improved DEMUX circuit, respectively, taking two output channels as an example, each output channel is distributed to three data lines.

Therefore, there is an urgent need for a new demultiplexer that can reduce the size and power consumption by reducing a number of MUX control signals and TFTs, and at a same time, achieving better display uniformity on the display panel.

SUMMARY

To solve the foregoing problems, embodiments of the present application provide a demultiplexer and a driving method thereof, and a display panel having the demultiplexer.

In a first aspect, an embodiment of the present application provides a demultiplexer including:

N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, and K being a positive integer greater than 1;

N metal electrode plates, the N metal electrode plates connected to each other, and each metal electrode plate stacked with another data line corresponding to each output channel so as to form a coupling capacitance between each metal electrode plate and the another data line corresponding to each output channel.

In some embodiments, a source of the switching transistor is connected to the output channel, a drain of the switching transistor is connected to a data line, and a capacitance value of the coupling capacitance is same as a capacitance value of a gate-source parasitic capacitance of the switching transistor or a capacitance value of a gate-drain parasitic capacitance of the switching transistor.

In some embodiments, a source of the switching transistor is connected to a data line, a drain of the switching transistor is connected to the output channel, and a capacitance value of the coupling capacitance is same as a capacitance value of a gate-source parasitic capacitance of the switching transistor or a capacitance value of a gate-drain parasitic capacitance of the switching transistor.

In some embodiments, the demultiplexer further comprises a coupling capacitance control signal line, and the N metal electrode plates are all connected to the coupling capacitance control signal line.

In a second aspect, an embodiment of the present application also provides a method for driving a demultiplexer includes following steps of:

S1, enabling (K−1) multiplexing control signal lines to be provided with high level in sequence during (K−1) periods of each line scan cycle in sequence, so as to enable each output channel to provide data signals to corresponding (K−1) data lines in a time-division manner;

S2, enabling the (K−1) multiplexing control signal lines to be provided with low level, and coupling capacitance control signal line CUX to be provided with high level at a $K^{th}$ period of each line scan cycle, so as to enable each output channel to provide a data signal to another data line corresponding to each output channel.

In some embodiments, the step S1 specifically includes following steps of:

enabling a first multiplexing control signal line to be provided with a high level at a first period of each line scan cycle, so as to enable each output channel to provide data signals to a corresponding first data line and the another data line corresponding to each output channel;

enabling a second multiplexing control signal line to be provided with a high level at a second period of each line scan cycle, so as to enable each output channel to provide data signals to a corresponding second data line and the another data line corresponding to each output channel;

and so on, enabling a (K−1)th multiplexing control signal to be provided with a high level at a (K−1)th period of each line scan cycle, so as to enable each output channel to provide data signals to a corresponding (K−1)th data line and the another data line corresponding to each output channel.

In some embodiments, the step S2 specifically includes following steps of:

enabling the (K−1) multiplexing control signal lines to be provided with low level and the coupling capacitance control signal line to be provided with high level at a $K^{th}$ period of each line scan cycle;

enabling a potential of the another data line corresponding to each output channel to rise by a coupling capacitance formed between each metal electrode plate and the another data line corresponding to each output channel when the coupling capacitance control signal line is converted from the low level to the high level;

enabling a potential of the another data line corresponding to each output channel to fall by the coupling capacitance formed between each metal electrode plate and the another data line corresponding to each output channel when the coupling capacitance control signal line is converted from the high level to the low level.

In some embodiments, the demultiplexer comprises:

N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, and K being a positive integer greater than 1;

N metal electrode plates, the N metal electrode plates connected to each other, and each metal electrode plate stacked with another data line corresponding to each output channel so as to form a coupling capacitance between each metal electrode plate and the another data line corresponding to each output channel.

In some embodiments, a source of the switching transistor is connected to the output channel, a drain of the switching transistor is connected to a data line, and a capacitance value of the coupling capacitance is same as a capacitance value of a gate-source parasitic capacitance of the switching transistor or a capacitance value of a gate-drain parasitic capacitance of the switching transistor.

In some embodiments, a source of the switching transistor is connected to a data line, a drain of the switching transistor is connected to the output channel, and a capacitance value of the coupling capacitance is same as a capacitance value of a gate-source parasitic capacitance of the switching transistor or a capacitance value of a gate-drain parasitic capacitance of the switching transistor.

In some embodiments, the demultiplexer further comprises a coupling capacitance control signal line, and the N metal electrode plates are all connected to the coupling capacitance control signal line.

In a third aspect, an embodiment of the present application further provides a display panel, including a source driver, N*K data lines, and the demultiplexer as described above, which are connected in sequence, wherein the source driver uses a time-division method to input data signals to corresponding K data lines through each output channel of the demultiplexer;

the demultiplexer comprising:

N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, and K being a positive integer greater than 1;

N metal electrode plates, the N metal electrode plates connected to each other, and each metal electrode plate stacked with another data line corresponding to each output channel so as to form a coupling capacitance between each metal electrode plate and the another data line corresponding to each output channel.

In some embodiments, the display panel further includes a gate line and a pixel definition layer, wherein the metal electrode plates of the demultiplexer and the data lines are arranged in different layers; and the metal electrode plates are arranged in a same layer as at least one of the gate line and the pixel definition layer.

In some embodiments, the display panel further includes a coupling capacitance control signal line, and the metal electrode plates and the coupling capacitance control signal line are arranged in a same layer; or the metal electrode plates are multiplexed with the coupling capacitance control signal line.

In some embodiments, a source of the switching transistor is connected to the output channel, a drain of the switching transistor is connected to a data line, and a capacitance value of the coupling capacitance is same as a capacitance value of a gate-source parasitic capacitance of the switching transistor or a capacitance value of a gate-drain parasitic capacitance of the switching transistor.

In some embodiments, a source of the switching transistor is connected to a data line, a drain of the switching transistor is connected to the output channel, and a capacitance value of the coupling capacitance is same as a capacitance value of a gate-source parasitic capacitance of the switching transistor or a capacitance value of a gate-drain parasitic capacitance of the switching transistor.

In some embodiments, the demultiplexer further comprises a coupling capacitance control signal line, and the N metal electrode plates are all connected to the coupling capacitance control signal line.

Advantages of the Present Disclosure

The multiplexer and the driving method thereof, and the display panel having the multiplexer provided by embodiments of the present application, enable each output channel to input data signals to K data lines in a time-division manner, wherein each output channel is respectively connected to (K−1) data lines through (K−1) switching transistors and is directly connected to another data line; a metal electrode plate is arranged near the another data line of each output channel to form a coupling capacitance between each metal electrode plate and the another data line corresponding to each output channel. Therefore, by controlling change in potential of each metal electrode plate, the potential of the another data line changes accordingly based on the coupling capacitance, so that a feedthrough effect on the another data line corresponding to each output channel is close to that on other (K−1) data lines, and brightness of a pixel unit controlled by the another data line corresponding to each output channel is approximately same as that of a plurality of pixel units controlled by other (K−1) data lines, thereby reducing size and power consumption of the DEMUX circuit, and at a same time, achieving better display uniformity on the display panel.

BRIEF DESCRIPTION OF DRAWINGS

FIG. 1A is a schematic structural diagram of a traditional 1:K DEMUX circuit in the prior art.

FIG. 1B is a timing diagram of the DEMUX circuit of FIG. 1A.

FIG. 2A is a schematic structural diagram of a traditional 1:3 DEMUX circuit in the prior art.

FIG. 2B is a timing diagram of the DEMUX circuit of FIG. 2A.

FIG. 3A is a schematic structural diagram of an improved 1:K DEMUX circuit in the prior art.

FIG. 3B is a timing diagram of the DEMUX circuit of FIG. 3A.

FIG. 4A is a schematic structural diagram of an improved 1:3 DEMUX circuit in the prior art.

FIG. 4B is a timing diagram of the DEMUX circuit of FIG. 4A.

FIG. 5A is a schematic structural diagram of a 1:K DEMUX circuit provided by an embodiment of the present application.

DETAILED DESCRIPTION

To make the objectives, technical solutions, and advantages of this application clearer, the following further describes this application in detail with reference to the accompanying drawings and embodiments. It should be understood that specific embodiments described herein are used for explaining this application, but not used for limiting this application.

Figure 5B:
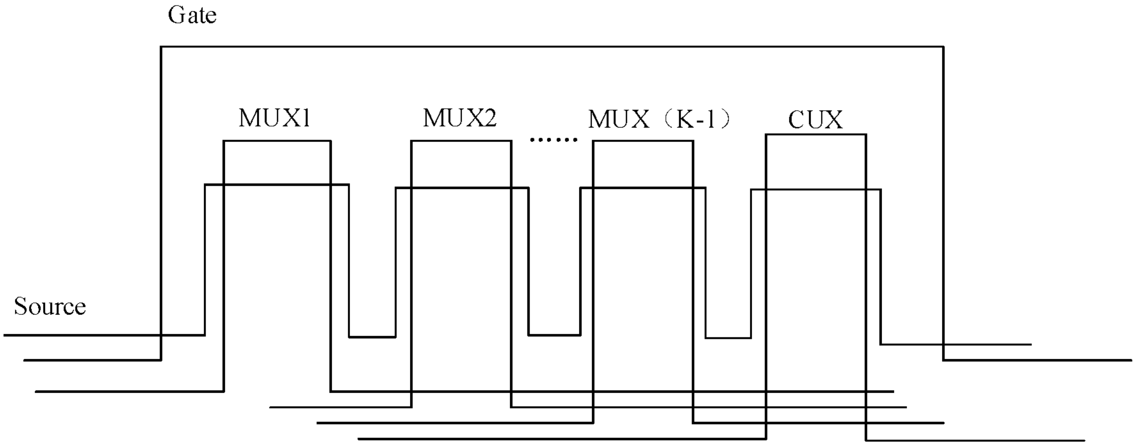
FIG. 5B is a timing diagram of the DEMUX circuit of FIG. 5A.

With reference to FIG. 5A and FIG. 5B together, an embodiment of the present application provides a demultiplexer including:

- N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, K being a positive integer greater than 1;
- N metal electrode plates, the N metal electrode plates connected to each other, and each metal electrode plate stacked with another data line corresponding to each output channel so as to form a coupling capacitance between each metal electrode plate and the another data line corresponding to each output channel.

It should be noted that, in FIG. 5A, the another data line corresponding to each output channel is set as a $K^{th}$ data line. Wherein the N output channels are CH1, CH2, . . . , CH(N); the (K−1) multiplexing control signal lines are MUX1, MUX2, . . . , MUX(K−1); another data lines are D1K, D2K, . . . , DNK; switching transistors connected to a first output channel CH1 are T11, T12, . . . , T1(K−1), and the first output channel CH1 is configured to input data signals to data lines D11, D12, . . . , D1(K−1), and another data line D1K corresponding to a first output channel; the switching transistors connected to a second output channel CH2 are T21, T22, . . . , T2(K−1), and the second output channel CH2 is configured to input data signals to data lines D21, D22, . . . , D2(K−1), and another data line D2K corresponding to a second output channel; and so on, the switching transistors connected to an $N^{th}$ output channel CH(N) are TN1, TN2, . . . , TN(K−1), and the $N^{th}$ output channel CH(N) is configured to input data signals to data lines DN1, DN2, . . . , DN(K−1) and another data line DNK corresponding to a $K^{th}$ output channel.

Specifically, a working principle of the demultiplexer is that: each output channel inputs data signals to K data lines in a time-division manner, wherein each output channel is connected to (K−1) data lines (e.g., a first data line to a (K−1)th data line) through (K−1) switching transistors respectively, and is directly connected to the another data line (e.g., a $K^{th}$ data line). A metal electrode plate is arranged near the another data line of each output channel to form a coupling capacitance between each output channel and the metal electrode plate nearby to the output channel, and a potential of the another data line changes accordingly through a potential change of the coupling capacitance, this reduces a difference between a feedthrough effect of the another data line corresponding to each output channel and a feedthrough effect of other (K−1) data lines, thus reducing a difference between brightness of a pixel unit controlled by the another data line corresponding to each output channel and brightness of a plurality of pixel units controlled by the other (K−1) data lines, and improving a display uniformity of the display panel.

Compared with a traditional DEMUX circuit shown in FIG. 1A, in the DEMUX circuit provided by the embodiment of the present application, each output channel is directly connected to the another data line corresponding to each output channel without being connected through a switching transistor, so the DEMUX circuit can be reduced in size and power consumption. At a same time, compared to an improved DEMUX circuit shown in FIG. 3A, the another data line corresponding to each output channel forms a coupling capacitance with the metal electrode plate nearby to the another data line, and a potential of the another data line corresponding to each output channel is compensated by this coupling capacitance, so that a feedthrough effect on the another data line corresponding to each output channel is close to the feedthrough effect on the other (K−1) data lines. As a result, the brightness of the pixel unit controlled by the another data line corresponding to each output channel is substantially indistinguishable from that of the plurality of pixel units controlled by the other (K−1) data lines, thereby improving the display uniformity of the display panel. Thus, the DEMUX circuit provided by the embodiment of the present application can reduce the size and power consumption of the DEMUX circuit, and at a same time, achieve better display uniformity on the display panel.

The demultiplexer further includes a coupling capacitance control signal line CUX, and the N metal electrode plates are all connected to the coupling capacitance control signal line CUX, and potentials of the N metal electrode plates may be controlled uniformly through the coupling capacitance control signal line CUX.

It should be noted that the metal electrode plate can be provided so that a capacitance value of the coupling capacitance formed between the metal electrode plate and the another data line corresponding to each output channel is as much the same as the capacitance value of a gate-source parasitic capacitance Cgs or a gate-drain parasitic capacitance Cgd of the switching transistor, so that the another data line corresponding to each output channel is subjected to same feedthrough effects as the other (K−1) data lines. This results in essentially no difference in brightness between the pixel unit controlled by the another data line and the plurality of pixel units controlled by the other (K−1) data lines.

It can be understood that an area of the metal electrode plate and a spacing between the metal electrode plate and the another data line corresponding to each output channel are adjustable, so that the capacitance value of the coupling capacitance is equal to that of the gate-source parasitic capacitance Cgs or the gate-drain parasitic capacitance Cgd of the switching transistor by adjusting the capacitance value of the coupling capacitance.

Wherein, in some embodiments, a source of the switching transistor is connected to the output channel, a drain of the switching transistor is connected to a data line, and the capacitance value of the coupling capacitance is same as the capacitance value of the gate-source parasitic capacitance of the switching transistor or the capacitance value of the gate-drain parasitic capacitance of the switching transistor. Alternatively, in some embodiments, the source of the switching transistor is connected to the data line, the drain of the switching transistor is connected to the output channel, and the capacitance value of the coupling capacitance is same as the capacitance value of the gate-source parasitic capacitance of the switching transistor or the capacitance value of the gate-drain parasitic capacitance of the switching transistor.

Specifically, the coupling capacitance formed by the another data line corresponding to each output channel and the metal electrode plate is configured to couple a potential of the another data line, and the coupling capacitance is equal to a parasitic capacitance of the switching transistor connected to the other (K−1) data lines, so that when the source of the switching transistor is connected to the data line, the coupling capacitance is same as the gate-source parasitic capacitance Cgs of the switching transistor or the gate-drain parasitic capacitance Cgd of the switching transistor, and when the drain of the switching transistor is connected to the data line, the coupling capacitance is same as the gate-source parasitic capacitance Cgs of the switching transistor or the gate-drain parasitic capacitance Cgd of the switching transistor, so that the feedthrough effect on the another data line corresponding to each output channel is substantially same as that on the other (K−1) data lines, and thus the pixel unit controlled by the another data line corresponding to each output channel has substantially same brightness as the plurality of pixel units controlled by the other (K−1) data lines.

Figure 11:
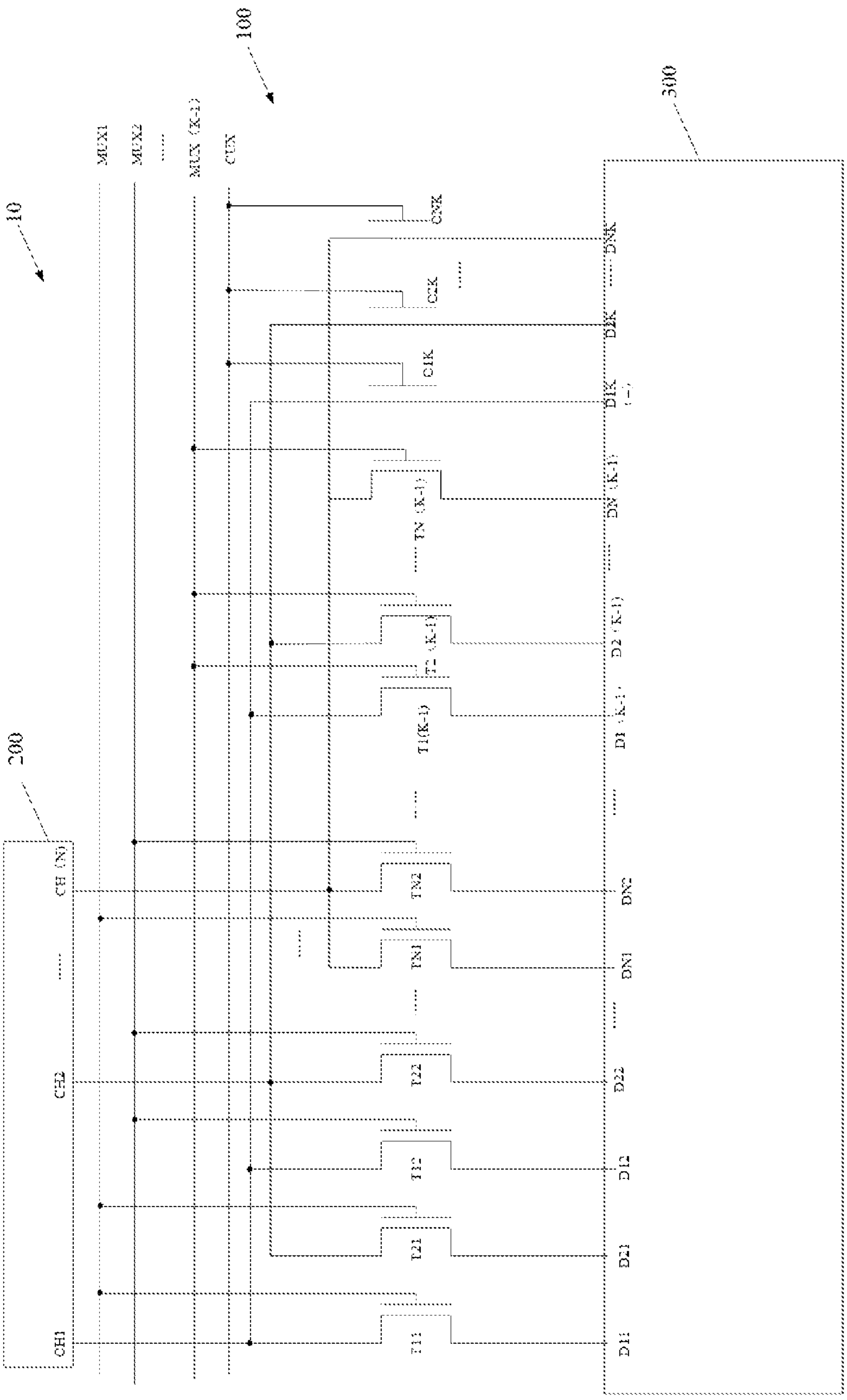
FIG. 11 is a schematic structural diagram of a display panel according to an embodiment of the present application.

Based on the foregoing embodiments, as shown in FIG. 11, an embodiment of the present application further provides a display panel 10 including a source driver 200, N*K data lines, and a multiplexer 100 as described above, and the display panel 10 further includes a panel 300, wherein the source driver 200 uses a time-division method to input data signals to corresponding K data lines through each output channel of the multiplexer 100, so that the panel 300 is driven by data lines to perform an image display.

Further, the display panel further comprises a gate line Gate and a pixel definition layer PXL, wherein the metal electrode plate C of the multiplexer and the data lines Data are arranged in different layers; the metal electrode plate C is arranged in a same layer as at least one of the gate line Gate and the pixel definition layer.

Figure 7:
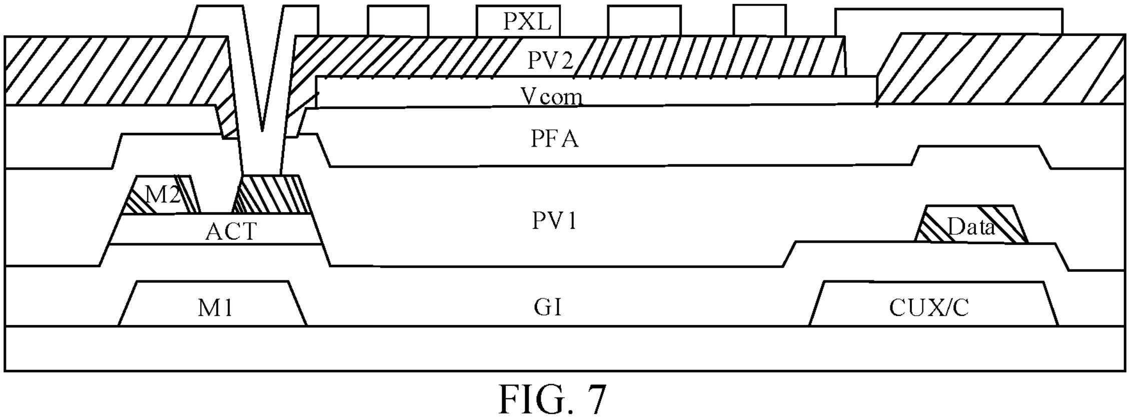
FIG. 7 is a schematic diagram of a first type of film layers forming a coupling capacitance in a DEMUX circuit provided by an embodiment of the present application.
Figure 8:
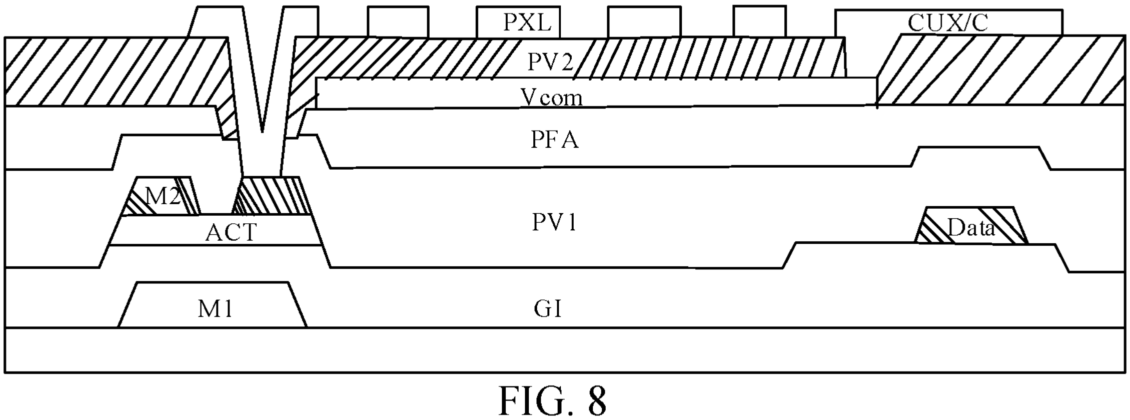
FIG. 8 is a schematic diagram of a second type of film layers forming the coupling capacitance in the DEMUX circuit provided by an embodiment of the present application.
Figure 9:
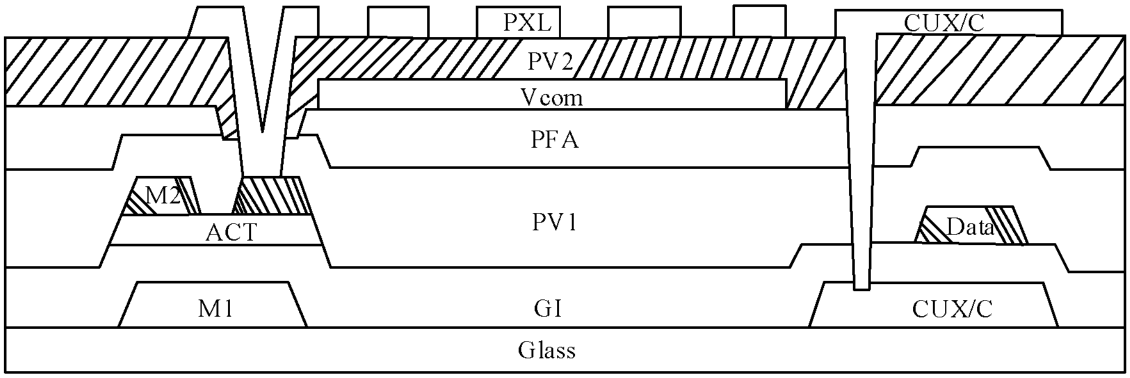
FIG. 9 is a schematic diagram of a third type of film layers forming the coupling capacitance in the DEMUX circuit provided by an embodiment of the present application.

Further, the display panel further includes a coupling capacitance control signal line, the metal electrode plate C and the coupling capacitance control signal line CUX are arranged in a same layer; alternatively, the metal electrode plate C is multiplexed with the coupling capacitance control signal line (as CUX/C in FIGS. 7-9).

Specifically, the metal electrode plate C is arranged in a same layer as the coupling capacitance control signal line CUX, and is arranged in different layers to the data line Data, that is, the metal electrode plate C may be part of the coupling capacitance control line CUX, and an insulating layer is disposed between the metal electrode plate C and the data line Data, such that a coupling capacitance is formed between the metal electrode plate C and the data line Data.

In some embodiments, as shown in FIG. 5A, the coupling capacitance control signal line CUX is arranged in parallel with (K−1) multiplexing control signal lines, and the coupling capacitance control signal line CUX is connected to the metal electrode plate C through a connection line, wherein the connection line is arranged in a same layer as the metal electrode plate C and the coupling capacitance control signal line CUX.

In some embodiments, the metal electrode plate C and the coupling capacitance control signal line CUX are arranged in a same layer as the gate line Gate, or the metal electrode plate C and the coupling capacitance control signal line CUX are arranged in the pixel definition layer.

Specifically, as shown in FIG. 7, the metal electrode plate C and the coupling capacitance control signal line CUX are arranged in a same layer as the gate line Gate in a first metal layer M1, and an insulating layer between the metal electrode plate C and the coupling capacitance control signal line CUX and the another data line Data corresponding to each output channel is a gate insulating layer GI, so that a coupling capacitance is formed between the metal electrode plate C and the coupling capacitance control signal line CUX and the another data line Data corresponding to each output channel.

Alternatively, as shown in FIG. 8, the metal electrode plate C and the coupling capacitance control signal line CUX are arranged in the pixel definition layer PXL, and insulating layers between the metal electrode plate C and the coupling capacitance control signal line CUX and the another data line Data corresponding to each output channel are a first transparent insulating layer PV1, a polarizing layer PFA, and a second transparent insulating layer PV2, so that a coupling capacitance is formed between the metal electrode plate C and the coupling capacitance control signal line CUX and the another data line Data corresponding to each output channel.

Alternatively, as shown in FIG. 9, a part of the metal electrode plate C and the coupling capacitance control signal line CUX is arranged in a same layer as the gate line Gate in a first metal layer M1, and another part of the metal electrode plate C and the coupling capacitance control signal line CUX is arranged in the pixel definition layer PXL layer, that is, a part of a space in the pixel definition layer PXL is dedicated as a part of the metal electrode plate C and the coupling capacitance control line CUX, and the another part of the metal electrode plate C and the coupling capacitance control line CUX is arranged in the first metal layer M1, and these two parts of the coupling capacitance control signal line CUX are connected to each other by a via. Insulating layers between the metal electrode plate C and the coupling capacitance control signal line CUX and the another data line Data corresponding to each output channel are a gate insulating layer GI, a first transparent insulting layer PV1, a polarizing layer PFA, and a second transparent insulting layer PV2, so that a coupling capacitance is formed between the metal electrode plate C and the coupling capacitance control signal line CUX and the another data line Data corresponding to each output channel.

It should be noted that in FIGS. 7-9, glass is a glass substrate, M2 is a second metal layer, Vcom is a common electrode layer, and ACT is an active semiconductor layer, wherein the common electrode layer Vcom and the pixel definition layer PXL are made of indium tin oxide (ITO) material.

Figure 10:
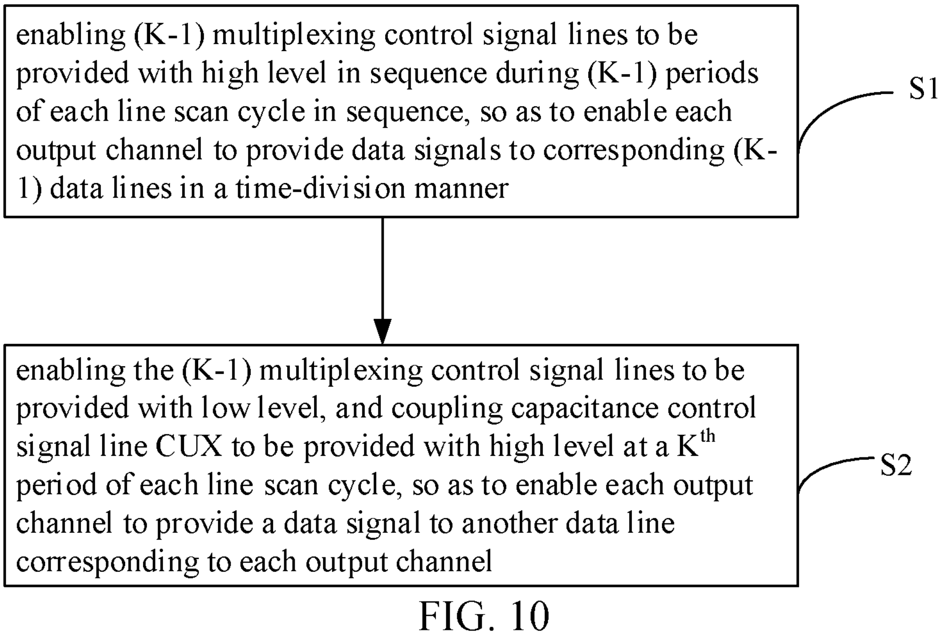
FIG. 10 is a schematic flowchart of a method for driving a demultiplexer according to an embodiment of the present application.

Based on the foregoing embodiments, in conjunction with FIG. 5A, FIG. 5B, and FIG. 10, an embodiment of the present application further provides a method for driving a multiplexer, including following steps of:

S1, enabling (K−1) multiplexing control signal lines MUX1 to MUX(K−1) to be provided with high level in sequence during (K−1) periods of each line scan cycle in sequence, so as to enable each output channel to provide data signals to corresponding (K−1) data lines in a time-division manner;

S2, enabling the (K−1) multiplexing control signal lines to be provided with low level, and coupling capacitance control signal line CUX to be provided with high level at a $K^{th}$ period of each line scan cycle, so as to enable each output channel to provide a data signal to another data line corresponding to each output channel.

In some embodiments, the step S1 specifically includes following steps of:

enabling a first multiplexing control signal line MUX1 to be provided with a high level at a first period of each line scan cycle, so as to enable each output channel to provide data signals to a corresponding first data line and the another data line corresponding to each output channel;

enabling a second multiplexing control signal line MUX2 to be provided with a high level at a second period of each line scan cycle, so as to enable each output channel to provide data signals to a corresponding second data line and the another data line corresponding to each output channel;

and so on, enabling a (K−1)th multiplexing control signal to be provided with a high level at a (K−1)th period of each line scan cycle, so as to enable each output channel to provide data signals to a corresponding (K−1)th data line and the another data line corresponding to each output channel.

In some embodiments, the step S2 specifically includes following steps of:

enabling (K−1) multiplexing control signal lines MUX1-MUX(K−1) to be provided with a low level and the coupling capacitance control signal line CUX to be provided with a high level at a $K^{th}$ period of each line scan cycle;

enabling a potential of another data line to rise by a coupling capacitance formed between each metal electrode plate and the another data line corresponding to each output channel when the coupling capacitance control signal line is converted from the low level to the high level;

enabling a potential of the another data line to fall by the coupling capacitance formed between each metal electrode plate and the another data line corresponding to each output channel when the coupling capacitance control signal line is converted from the high level to the low level.

Specifically, each line scan cycle consists of K periods in sequence. At the first period, MUX1 provides high level, MUX2-MUX(K−1) provide low level, CH1 inputs a data signal to D11 via T11 and directly inputs a data signal to D1K, CH2 inputs a data signal to D21 via T21 and directly inputs a data signal to D2K, . . . , CH(N) inputs a data signal to DN1 via TN1 and directly inputs a data signal to DNK; at the second period, MUX2 provides high level, MUX1, MUX3-MUX(K−1) provide low level, CH1 inputs a data signal to D12 via T12 and directly inputs a data signal to D1K, CH2 inputs a data signal to D22 via T22 and directly inputs a data signal to D2K, . . . , CH(N) inputs a data signal to DN2 via TN2 and directly inputs a data signal to DNK, and so on, at a (K−1)th period, MUX(K−1) provides high level, MUX1-MUX(K−2) provide low level, CH1 inputs a data signal to D1(K−1) via T1(K−1) and directly inputs a data signal to D1K, CH2 inputs a data signal to D2(K−1) via T2(K−1) and directly inputs a data signal to D2K, . . . , CH(N) inputs a data signal to DN(K−1) via TN(K−1) and directly inputs a data signal to DNK; at a $K^{th}$ period, MUX1-MUX(K−1) provide low level, CUX provides high level, CH1 directly inputs a data signal to D1K, CUX couples a potential of D1K via C1K. CH2 directly inputs a data signal to D2K, CUX couples a potential of D2K via C2K, . . . , CH(N) directly inputs a data signal to DNK, and CUX couples a potential of DNK via CNK.

That is, from the first period to the $(K-1)^{th}$ period of each line scan cycle, MUX1-MUX(K−1) provide high levels in sequence, and each output channel respectively inputs data signals to the corresponding first data line to the corresponding $(K-1)^{th}$ data line, and inputs a data signal to the another data line corresponding to each output channel, i.e., a $K^{th}$ data line. At the $K^{th}$ period, MUX1-MUX(K−1) all provide low levels, the coupling capacitance control signal line CUX provides high level, and each output channel only inputs a data signal to the another data line corresponding to each output channel, i.e., the $K^{th}$ data line, thus forming a finally displayed image for each frame. Wherein at the $K^{th}$ period, when the coupling capacitance control signal is on a rising edge from the low level to the high level, the coupling capacitance formed by the another data line corresponding to each output channel and the metal electrode plate causes a potential of the $K^{th}$ data line to rise; when the coupling capacitance control signal is on a falling edge from the high level to the low level, the coupling capacitance formed by the another data line corresponding to each output channel and the metal electrode plate causes the potential of the $K^{th}$ data line to fall, so that a feedthrough effect on the $K^{th}$ data line is substantially same as that on the other (K−1) data lines, and brightness of a pixel unit controlled by the $K^{th}$ data line is same as brightness of a plurality of pixel units controlled by the other (K−1) data lines, thus improving display uniformity of the display panel.

It should be noted that the another data line corresponding to each output channel may be any one of the K data lines input a data signal by each output channel in a time-division manner. However, it should be noted that, since the data signal received by the another data line need to be received at a last period to enable the pixel unit controlled by the another data line to realize the finally displayed image corresponding to the data signal received at the last period, each output channel should only input a data signal to the another data line, while no data signal is input to any of the other (K−1) data lines at the last period.

Figure 6A:
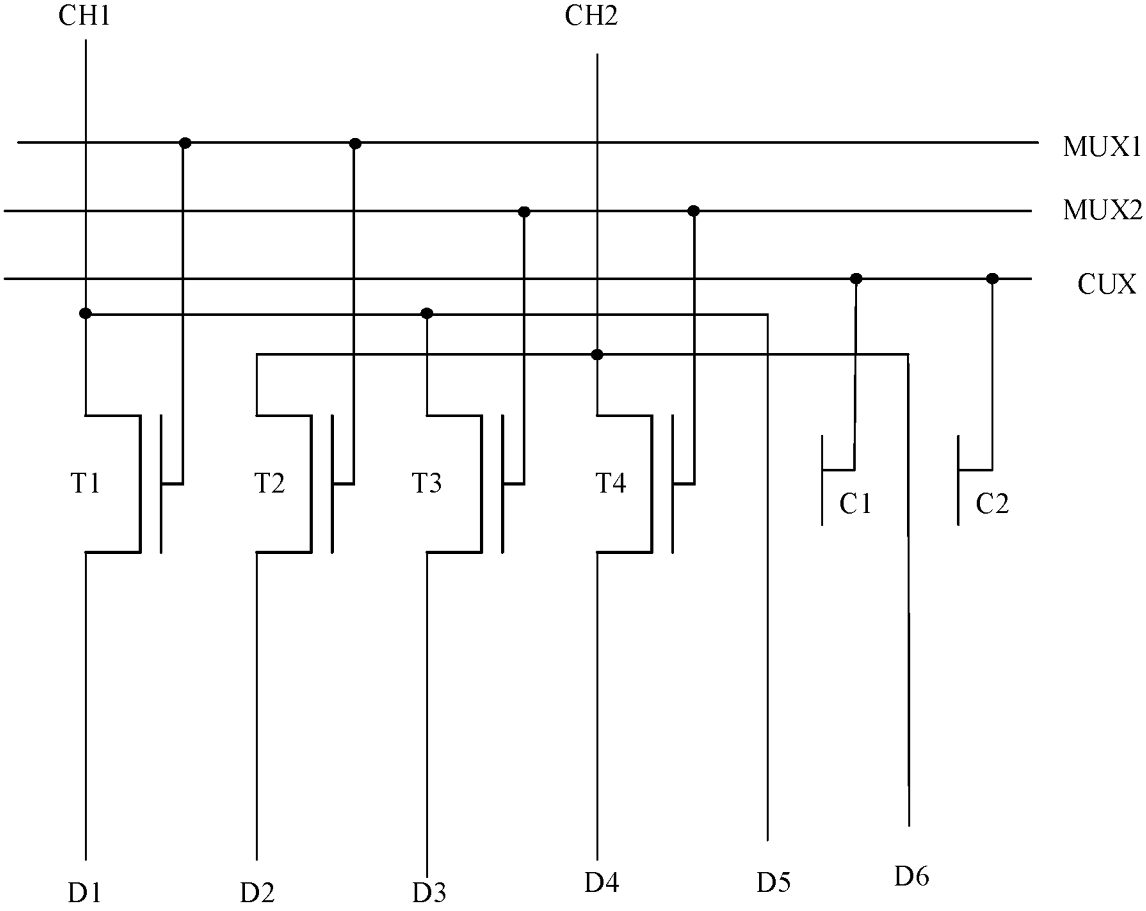
FIG. 6A is a schematic structural diagram of a 1:3 DEMUX circuit provided by an embodiment of the present application.
Figure 6B:
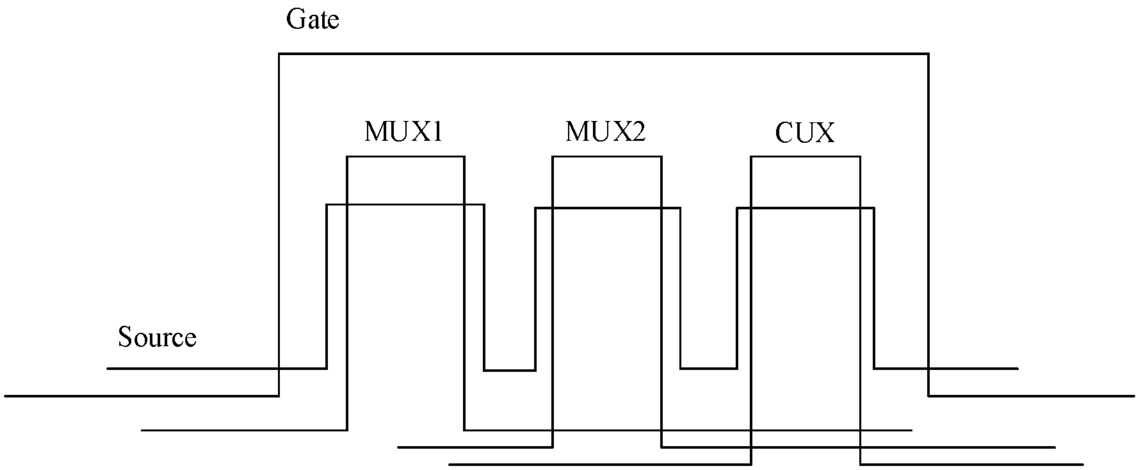
FIG. 6B is a timing diagram of the DEMUX circuit of FIG. 6A.

Based on the foregoing embodiments, as shown in FIG. 6A and FIG. 6B, with N=2 and K=3 as an example, the multiplexer, under a control of two multiplexing control signal lines MUX1 and MUX2 and one coupling capacitance control signal line CUX, distributes two output channels CH1 and CH2 via four switching transistors T1, T2, T3, and T4 and two capacitors C1 and C2 to six data lines D1, D2, D3, D4, D5, and D6, wherein the data signals are input to data lines D1, D3, and D5 via the first output channel CH1 in the time-division manner, and the data signals are input to data lines D2, D4, and D6 via the second output channel CH2 in the time-division manner.

Specifically, at the first period of each line scan cycle, MUX1 provides high level, MUX2 and CUX provide low level, T1 and T2 are turned on, CH1 inputs a data signal to D1 via T1 and directly inputs a data signal to T5, and CH2 inputs a data signal to D2 via T2 and directly inputs a data signal to T6; at the second period of each line scan cycle, MUX2 provides high level, MUX1 and CUX provide low level, CH1 inputs a data signal to D3 via T3 and directly inputs a data signal to D5, CH2 inputs a data signal to D4 via T4 and directly inputs a data signal to D6; at the third period of each line scan cycle, MUX1 and MUX2 provide low level, CUX provides high level, CH1 directly inputs a data signal to D5 and CH2 directly inputs a data signal to D6. At this time, when CUX is converted from low level to high level, the coupling effect of C1 causes a potential of D5 to rise and the coupling effect of C2 causes a potential of D6 to rise, while when CUX is converted from high level to low level, the coupling effect of C1 causes the potential of D5 to fall and the coupling effect of C2 causes the potential of D6 to fall, that is, so that D5 and D6 and D1, D2, D3, and D4 are subject to essentially no difference in the feedthrough effects, and the pixel units controlled by D5 and D6 have essentially same brightness as the pixel units controlled by D1, D2, D3, and D4, thereby improving the display uniformity of the display panel.

It should be noted that present application is not limited to the exemplary examples. Those skilled in the art in the art may achieve equivalent improvements or replacements according to the above description. The equivalent improvements and replacements should be considered to belong to the protection scope of the present application.

What is claimed is:

1. A demultiplexer comprising:

N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, and K being a positive integer greater than 1;

N metal electrode plates, the N metal electrode plates connected to each other, and each metal electrode plate stacked with another data line corresponding to each output channel so as to form a coupling capacitance between each metal electrode plate and the another data line corresponding to each output channel.

2. The demultiplexer as claimed in claim 1, wherein a source of the switching transistor is connected to the output channel, a drain of the switching transistor is connected to a data line, and a capacitance value of the coupling capacitance is same as a capacitance value of a gate-source parasitic capacitance of the switching transistor or a capacitance value of a gate-drain parasitic capacitance of the switching transistor.

3. The demultiplexer as claimed in claim 1, wherein a source of the switching transistor is connected to a data line, a drain of the switching transistor is connected to the output channel, and a capacitance value of the coupling capacitance is same as a capacitance value of a gate-source parasitic capacitance of the switching transistor or a capacitance value of a gate-drain parasitic capacitance of the switching transistor.

4. The demultiplexer as claimed in claim 1, wherein the demultiplexer further comprises a coupling capacitance control signal line, and the N metal electrode plates are all connected to the coupling capacitance control signal line.

5. A method for driving a demultiplexer, comprising following steps of:

S1, enabling (K−1) multiplexing control signal lines to be provided with high level in sequence during (K−1) periods of each line scan cycle in sequence, so as to enable each output channel to provide data signals to corresponding (K−1) data lines in a time-division manner;

S2, enabling the (K−1) multiplexing control signal lines to be provided with low level, and coupling capacitance control signal line CUX to be provided with high level at a Kth period of each line scan cycle, so as to enable each output channel to provide a data signal to another data line corresponding to each output channel;

wherein the demultiplexer comprises:

N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, and K being a positive integer greater than 1;

N metal electrode plates, the N metal electrode plates connected to each other, and each metal electrode plate stacked with another data line corresponding to each output channel so as to form a coupling capacitance between each metal electrode plate and the another data line corresponding to each output channel.

6. The method for driving the demultiplexer as claimed in claim 5, wherein the step S1 specifically comprises following steps of:

enabling a first multiplexing control signal line to be provided with a high level at a first period of each line scan cycle, so as to enable each output channel to provide data signals to a corresponding first data line and the another data line corresponding to each output channel;

enabling a second multiplexing control signal line to be provided with a high level at a second period of each line scan cycle, so as to enable each output channel to provide data signals to a corresponding second data line and the another data line corresponding to each output channel;

and so on, enabling a (K−1)th multiplexing control signal to be provided with a high level at a (K−1)th period of each line scan cycle, so as to enable each output channel to provide data signals to a corresponding (K−1)th data line and the another data line corresponding to each output channel.

7. The method for driving the demultiplexer as claimed in claim 5, wherein the step S2 specifically comprises following steps of:

enabling the (K−1) multiplexing control signal lines to be provided with low level and the coupling capacitance control signal line to be provided with high level at a Kth period of each line scan cycle;

enabling a potential of the another data line corresponding to each output channel to rise by a coupling capacitance formed between each metal electrode plate and the another data line corresponding to each output channel when the coupling capacitance control signal line is converted from the low level to the high level;

enabling a potential of the another data line corresponding to each output channel to fall by the coupling capacitance formed between each metal electrode plate and the another data line corresponding to each output channel when the coupling capacitance control signal line is converted from the high level to the low level.

8. The method for driving the demultiplexer as claimed in claim 5, wherein a source of the switching transistor is connected to the output channel, a drain of the switching transistor is connected to a data line, and a capacitance value of the coupling capacitance is same as a capacitance value of a gate-source parasitic capacitance of the switching transistor or a capacitance value of a gate-drain parasitic capacitance of the switching transistor.

9. The method for driving the demultiplexer as claimed in claim 5, wherein a source of the switching transistor is connected to a data line, a drain of the switching transistor is connected to the output channel, and a capacitance value of the coupling capacitance is same as a capacitance value of a gate-source parasitic capacitance of the switching transistor or a capacitance value of a gate-drain parasitic capacitance of the switching transistor.

10. The method for driving the demultiplexer as claimed in claim 5, wherein the demultiplexer further comprises a coupling capacitance control signal line, and the N metal electrode plates are all connected to the coupling capacitance control signal line.

11. A display panel, comprising a source driver, N*K data lines, and a demultiplexer connected in sequence, wherein the source driver uses a time-division method to input data signals to corresponding K data lines through each output channel of the demultiplexer;

the demultiplexer comprising:

N output channels, each output channel respectively connected to (K−1) data lines through (K−1) switching transistors and directly connected to another data line, wherein (K−1) switching transistors corresponding to each output channel are respectively connected to (K−1) multiplexing control signal lines, N being a positive integer, and K being a positive integer greater than 1;

N metal electrode plates, the N metal electrode plates connected to each other, and each metal electrode plate stacked with another data line corresponding to each output channel so as to form a coupling capacitance between each metal electrode plate and the another data line corresponding to each output channel.

12. The display panel as claimed in claim 11, wherein the display panel further comprises a gate line and a pixel definition layer, wherein the metal electrode plates of the demultiplexer and the data lines are arranged in different layers; and the metal electrode plates are arranged in a same layer as at least one of the gate line and the pixel definition layer.

13. The display panel as claimed in claim 11, the display panel further includes a coupling capacitance control signal line, and the metal electrode plates and the coupling capacitance control signal line are arranged in a same layer; or the metal electrode plates are multiplexed with the coupling capacitance control signal line.

14. The display panel as claimed in claim 11, wherein a source of the switching transistor is connected to the output channel, a drain of the switching transistor is connected to a data line, and a capacitance value of the coupling capacitance is same as a capacitance value of a gate-source parasitic capacitance of the switching transistor or a capacitance value of a gate-drain parasitic capacitance of the switching transistor.

15. The display panel as claimed in claim 11, wherein a source of the switching transistor is connected to a data line, a drain of the switching transistor is connected to the output channel, and a capacitance value of the coupling capacitance is same as a capacitance value of a gate-source parasitic capacitance of the switching transistor or a capacitance value of a gate-drain parasitic capacitance of the switching transistor.

16. The display panel as claimed in claim 11, wherein the demultiplexer further comprises a coupling capacitance control signal line, and the N metal electrode plates are all connected to the coupling capacitance control signal line.

* * * * *